United States Patent [19]

May

[11] 3,781,458

[45] Dec. 25, 1973

[54] INSULATED CABLE SPLICE AND METHOD FOR MAKING THE SAME

[75] Inventor: Francis A. May, Pittsburgh, Pa.

[73] Assignee: Consolidation Coal Company, Pittsburgh, Pa.

[22] Filed: May 8, 1972

[21] Appl. No.: 250,889

Related U.S. Application Data

[63] Continuation-in-part of Ser. No. 179,445, Sept. 10, 1971.

[52] U.S. Cl................ 174/84 C, 79/628, 156/49, 156/56, 174/84 R
[51] Int. Cl........................................... H02g 15/08
[58] Field of Search............. 174/84 R, 84 C, 88 R, 174/90, 94 R; 156/49, 56

[56] References Cited
UNITED STATES PATENTS

| 2,209,743 | 7/1940 | Xenis | 174/84 R X |
| 2,864,882 | 12/1958 | Snell | 174/84 R |
| 3,127,291 | 3/1964 | Betz et al. | 174/84 U |
| 3,258,522 | 6/1966 | Bartos et al. | 174/84 X |

Primary Examiner—Darrell L. Clay
Attorney—D. Leigh Fowler, Jr. et al.

[57] ABSTRACT

The insulated cable splice joins the end portions of a metallic conductor by positioning the end portions in a metallic sleeve in overlapped relation to each other and the sleeve is deformed to frictionally engage the metallic conductor end portions. The surface of the cable adjacent the exposed end portion of the metallic conductor is buffed and thereafter the exposed end portions of the conductors on opposite sides of the metallic sleeve are helically wrapped with a tape to compress the conductor strands adjacent to the edges of the cable insulation. The recessed portion in the splice formed between the edges of the cable insulation is filled with an elastomeric filler material, preferably by helically winding a strip of elastomeric filler material over the exposed conductor end portions and the metallic sleeve. The outer surface of the filler material has a diameter slightly larger than the diameter of the sheath of insulation on the conductor. A liquid cement is applied to the outer buffed surface of the cable insulation and over the filled recessed portion between the edges of the cable insulation. A strip of elastomeric tape is helically wound in overlapped relation around the outer surface of the cable insulation and the helically wound elastomeric tape extends for preselected distances on opposite sides of the metallic sleeve. A portion of the cement applied on the surface of the cable insulation remains exposed beyond the ends of the tape winding. Thereafter, a plurality of elongated strips of flame and abrasion resistant tape are positioned longitudinally on the cable insulation in overlying relation with the helically wound elastomeric tape. The strips of flame and abrasion resistant tape are arranged with the side edges in overlapped relation to provide a water resistant splice. Strips of flame and abrasion resistant tape are helically wound about the end portions of the longitudinal strips and over portions of the cable insulation having the exposed layer of cement thereon to seal the ends of the splice. The above described helically wound elastomeric tape and plurality of strips of longitudinally positioned abrasion resistant tape may also be employed to repair damaged insulation on a cable where the conductor does not require splicing.

4 Claims, 7 Drawing Figures

PATENTED DEC 25 1973 3,781,458

INSULATED CABLE SPLICE AND METHOD FOR MAKING THE SAME

CROSS-REFERENCE TO RELATED APPLICATION

This application is a continuation-in-part of pending United States application, Ser. No. 179,445, entitled "An Improved Cable Splice And Apparatus Therefor," which was filed in the United States Patent Office on Sept. 10, 1971.

BACKGROUND OF THE INVENTION

1. Field of the Invention

This invention relates to a splice for an electrical cable and the method of making the same and more particularly to a splice for an electrical cable that includes a metallic member frictionally engaging the conductors and a plurality of layers of tape positioned thereover.

2. Description of the Prior Art

In underground mining substantially all of the equipment is electrically driven and power is supplied by means of conductor cables. The conductor cables extend for substantially long distances and when connected to movable mining equipment are subjected to abrasion, moisture and frequent flexing as, for example, when the cable is wound on a cable reel and when the cable extends around pulleys mounted on the mining equipment. The adverse conditions to which the cable is subjected frequently results in a parting of the conductors and it is necessary to either splice or replace the cable before mining operations can resume as quickly as possible. A splice, therefore, should be made with a minimum of tools at the location of the break in the cable and by one having ordinary skill with the tools.

The splice should be moisture resistant, since the cables are frequently dragged along the mine floor and through water. Because of the abuse to which the cables are subjected, the splice should be abrasion resistant and have dielectric properties similar to the insulation surrounding the conductor in the cable. The splice should also be flame resistant to minimize fire hazards. Of equal importance is the flexibility of the splice and its relative size. It is essential in trailing cables that the splice be flexible enough to bend around pulleys and be wound on a cable reel. The diameter of the splice is limited by the size of the pulleys through which cable passes.

Another desirable feature of a splice is that it have a parting or tensile strength that is less than the parting or tensile strength of the cable. With a splice having a lower tensile strength the cable, when subjected to excessive tension, will part at the splice rather than break at another location. The cable can then be respliced at the previous splice much faster than preparing a broken or parted section of a cable for a new splice.

Compression type couplings for splicing or connecting the metallic conductors are well known. U.S. Pat. No. 2,276,571 discloses a splice for joining together the ends of electrical wires where the ends are inserted in a metal tube or sleeve that has outwardly flared end portions. A flexible tubular piece of insulation is first positioned over one of the ends of the wire and then the wires are inserted in the metal tube. After the wires are inserted in the metal tube the wires are twisted in the opposite direction to effect intermingling of the strands of one wire with those of other wires. Thereafter, the tubular rubber insulation is positioned over the metal tube and has portions that extend beyond the metal tube and over the insulation on the wire. The intermediate portion of the metal sleeve is then flattened by means of pliers to deform the sleeve and to frictionally engage the wires and form the splice. This type of splice does not provide the moisture resistance nor the flexibility required for underground cables. Moreover, the intermingling of the strands of one wire with those of the other is limited to relatively thin wires and cannot with convenience be accomplished with the conductors employed in underground mining.

It is also known to provide heat shrinkable sleeves similar to the rubber sleeve disclosed in U.S. Pat. No. 3,276,571. After the ends of the conductors are secured by means of metal connectors, such as those disclosed in U.S. Pats. Nos. 2,734,933, 2,249,492 or 3,387,080, the heat shrinkable sleeve is then positioned over the spliced conductors and has portions that extend over the adjacent insulation. The heat shrinkable sleeve is then subjected to an elevated temperature as, for example, by an open flame propane torch or by an electrically operated heating device. It is apparent the use of an open flame torch is not desirable in underground operations nor is use of an electrically operated heating device. It has further been found that splices having the heat shrinkable insulation do not have the desired flexibility for extended use in underground mining operations. Frequently the cable will part at a location closely adjacent to the splice when the cable is subjected to substantial flexing. The heat shrinkable insulation is expensive and further requires special tools, heating devices and the like. The heat shrinkable insulation generally has a tubular configuration and is not suitable to repair damaged insulation where the metallic conductor has not parted. Proposals have been made to provide a separable seam in the tubular insulation for this purpose. Even with this modification the flexibility of the cable is lost at the heat shrinkable insulation.

There is a need for a cable splice that is inexpensive and may be quickly assembled where the cable breaks without removing the cable from the mining equipment. There is a further need for a splice that is flexible, flame resistant, abrasion resistant, moisture resistant and has acceptable dielectric properties.

SUMMARY OF THE INVENTION

In accordance with the present invention there is provided a method for splicing and insulating a conductor cable that includes inserting the ends of the conductors into the opposite ends of a deformable metallic sleeve with the ends of the conductors in overlapped relation. The sleeve is deformed to frictionally engage the ends of the conductors and the recess between the edges of the insulation on the conductors is filled with an elastomeric filler material to a diameter slightly larger than the diameter of the insulation on the conductors. An elastomeric tape is helically wrapped over the surface of the insulation on the conductors and the filler material surrounding the conductors secured in the sleeve. Thereafter, a plurality of elongated strips of abrasion resistant tape are positioned longitudinally over the helically wound elastomeric material with the side edges of the strips overlapping each other. The ends of the abrasion resistant strips of tape are thereafter helically wrapped with abrasion resistant tape to seal the ends of the strips to the insulation on the conductors.

A liquid cement may be applied to the insulation on the conductors before the elastomeric tape is helically wound thereon, leaving a portion of the cemented surface exposed adjacent the ends of the helical winding of the elastomeric tape. Thereafter, the abrasion resistant tape is helically wound over the exposed cement to effectively secure the abrasion resistant tape to the outer surface of the insulation on the cable.

The cable splice of the present invention preferably includes a metallic sleeve member positioned over the overlapped conductor end portions with the metallic sleeve being deformed to frictionally engage the conductor end portions. After the conductors are trimmed to expose undamaged ends and, in the case of multi-conductor cables, to provide proper offset of conductor splices, the exposed conductor insulation and the jacket are buffed or scraped to remove dirt, to roughen the surfaces and to enable good bonding of tapes to the original insulation and jacket. It is usually preferred to coat the conductors, the metallic sleeve, the insulation, and the jacket to give superior bonding of tapes to the cable materials. An elastomeric filler material fills the recess between the edges of the cable insulation to an extent that the recess is filled and has a diameter slightly larger than the cable insulation. Elastomeric tape is helically wound over the cable insulation and the elastomeric filler. Elongated strips of abrasion resistant tape extend longitudinally on the cable in overlapped relation and other strips of abrasion resistant tape are helically wound about the end portions of the elongated strips to provide moisture resistance for the ends of the splice. The splice made in accordance with this invention is abrasion and moisture and flame resistant and has acceptable dielectric properties. The cable with the splice thereon retains sufficient flexibility to be wound on a cable reel and pass over cable pulleys mounted on mobile mining equipment.

Other details and advantages of the invention will become apparent by reference to the drawings, the following detailed description and the appended claims.

DESCRIPTION OF THE PREFERRED EMBODIMENTS

Figure 1:
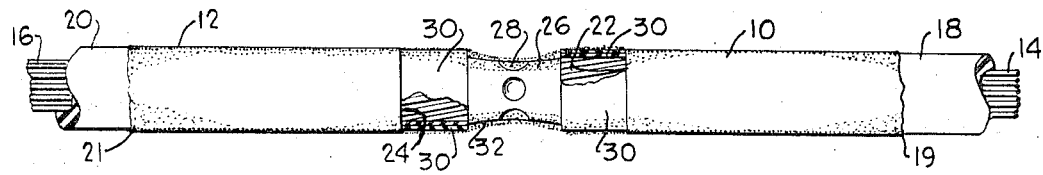
FIG. 1 illustrates a pair of electrical cables with the conductor end portions frictionally engaged by a metallic sleeve with the exposed end portions of the metallic conductors wrapped with a compressive tape and the surface of the end portions of the cable insulation having a cement applied thereto.

Referring now to the drawings, there is illustrated a pair of cable end portions 10 and 12 which have metallic conductors 14 and 16 enclosed or covered with insulation 18 and 20. The layer of insulation 18 is conventionally applied to the metallic conductor as a continuous layer and may be formed from various elastomeric materials, such as polyvinylchloride, neoprene or other rubber-like polymers.

In forming a cable splice according to the invention, the ends of the cables 10 and 12 are trimmed to remove a section of the insulation to expose lengths of the conductors 14 and 16 and provide annular end portions 22 and 24 stripped of the insulation 18 and 20. The trimmed or exposed end portions of cables 14 and 16 are inserted in a tubular metallic sleeve 26 in overlapped relation to each other. The metallic sleeve 26 is deformed, forming the indentations 28 therein to frictionally engage the conductor end portions 14 and 16 positioned therein. It is preferred that the frictional engagement between the sleeve 26 and the cable end portions be less than the tensile strength of the cable being spliced. A splice having tensile strength of about 85 percent of the safe tensile strength of the cable has been found suitable. With this type of splice the cable will part at the splice when subjected to tensile forces that approach the safe tensile strength of the cable so that the cable can be more readily respliced at the previous splice rather than preparing other parted ends of the cable for splicing.

After the end portions of the conductors 14 and 16 are frictionally engaged within the sleeve 26 the exposed ends of the conductors are wrapped with three to four wraps of a glass cloth tape 30. It is preferred that the tape be capable of being subjected to substantial tension and that it be wrapped about the conductor end portions to compress the severed copper wire ends of the conductors. The insulation 18 and 20 are buffed or scraped so that the cement and tapes subsequently applied will stick or bond adequately.

The surface of the insulation 18 and 20 and the sleeve 26 are coated with a liquid cement, preferably a cement compatible with the polymeric insulation on the metallic conductors 14 and 16. A suitable cement for use with polymeric insulation, such as polyvinylchloride or neoprene, may comprise approximately equal parts of reclaimed rubber solids in a conventional rubber solvent. The liquid cement is applied to the outer surface of the insulation 18 and 20 and terminates at locations 19 and 21 as illustrated in FIG. 1.

Figure 2:
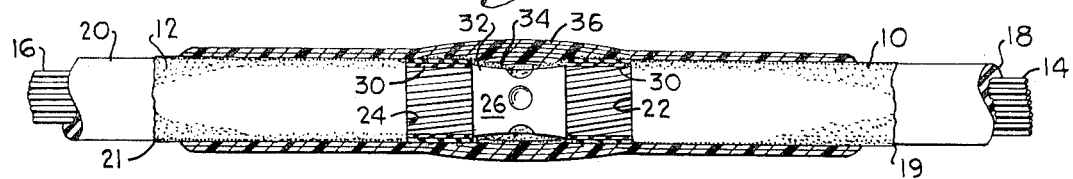
FIG. 2 is a view similar to FIG. 1, partially in section, illustrating the recessed portion between the ends of the cable insulation filled with an elastomeric filler material and the ends of the cable insulation and filler material wrapped with an elastomeric tape.
Figure 3:
FIG. 3 is a perspective view of the ends of the cable wrapped with the elastomeric tape and having portions of the cable insulation with the cement applied thereto extending beyond the elastomeric tape wrapping.

Subsequent to compressing the conductor cable end portions by wrapping the end portions with tape 30, the recessed portion formed between the edges 22 and 24 of the cable insulation 18 and 20 is filled with an elastomeric filler material 34. For convenience, the recessed portion in FIGS. 1 and 2 will be generally designated by the numeral 32. The elastomeric or filler material 34 may be applied as a filler putty or may be applied by helically wrapping elastomeric filler tape around the conductor end portions and the sleeve 26 until the recess between the edges 22 and 24 of the cable insulation is filled so that the filler material 34 has an outer surface 36 that has a diameter substantially the same or slightly larger than the diameter of the insulation 18 and 20 on the cables 10 and 12.

A suitable filler putty or elastomeric filler tape is sold by the Okanite Company, Ramsey, N.J., under the trade name Okonite Filler Tape and contains about 20 percent by weight synthetic elastomers, about 50 – 60 percent inorganic filler material, about 15 percent by weight rubber softeners and tackifiers and about 10 percent of a stabilizer and antioxidant. The softeners and tackifiers are perferably polybutene to provide a flexible elastomeric material which, upon being subjected to air, remains flexible and when subjected to a compressive force tends to fuse into a unitary piece of elastomeric material. It should be understood, however, that other filler material or tape having properties similar to the filler material of the above composition may be employed.

Subsequent to the filling of the recessed portion 32 a filler tape 38 having a composition similar to the filler material above discussed is helically wound around the insulation 20 on cable 12 and 18 on cable 10 with the wound strands of tape in overlapped relation. The wrapping of the tape 38 is initiated at a location spaced inwardly from the outer edge 21 of the cement applied to the surface of insulation 20 to provide an exposed area 40 of the cement. A tensile force is exerted on the tape as it is helically wound in overlapping relation around the insulation 20 to maintain the filler tape 38 in tension. The filler tape 38 is further wound around the outer surface 36 of the filler material 34 and then around the surface of the insulation 18 on cable 10. Winding is terminated so that a portion 42 of the cement remains exposed.

Figure 4:
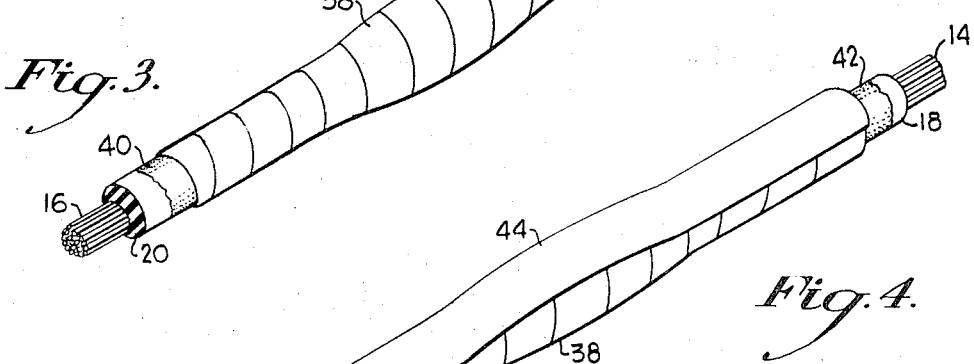
FIG. 4 is a perspective view of an elongated strip of flame and abrasion resistant jacketing tape positioned longitudinally on the helically wrapped elastomeric tape.
Figure 7:
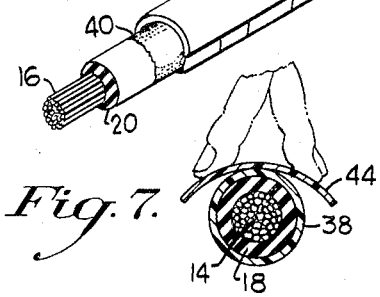
FIG. 7 illustrates the manner in which the elongated strips of jacketing tape are positioned on the helically wrapped elastomeric tape.
Figure 6:
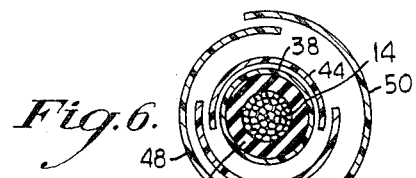
FIG. 6 is a diagrammatic view in section, illustrating the manner in which the elongated strips of jacketing tape overlap each other.
Figure 5:
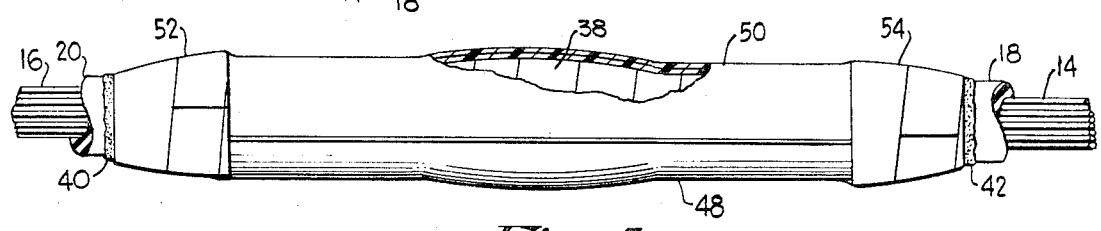
FIG. 5 is a view in side elevation and partially in section, illustrating the overlapped relation of the longitudinal strips of jacketing tape and the end portions of the overlapped jacketing tape helically wrapped with strips of jacketing tape.

Subsequent to the application of the tape 38 longitudinal strips of an abrasion and flame resistant jacketing tape are positioned over the filler tape 38 as illustrated in FIG. 4. The first strip 44 is positioned as illustrated in FIG. 7 and extends downwardly around the cylindrically shaped conductor 10 and 12. Three other strips of jacketing tape 46, 48 and 50 are applied in the same manner longitudinally over the filler tape 38 in a manner that the side edges of the elongated strips 44 are in overlapped relation. The overlapped relation of the strips 44 – 50 provides moisture resistance and further provides the desired flexibility of the splice. A suitable abrasion and flame resistant jacketing tape is manufactured by the Okonite Company in Ramsey, N.J. and is designated Okonite Jacketing tape 35. The jacketing tape is a polychoroprene elastomer insulating tape containing about 50 percent by weight of the polychoroprene elastomer, 45 percent by weight inorganic fillers and about 5 percent tackifiers, stabilizers and antioxidants. The jacketing tape 44 is abrasion resistant and provides for durability of the splice. In addition, the jacketing tape 44 is flame resistant and has desirable dielectric properties.

Subsequent to the application of the strips of jacketing tape 44 – 50, other strips of the same jacketing tape 52 and 54 are helically wound around the surface 20 of cable 12 and the surface 18 of cable 10 over the exposed areas of cement 40 and 42. With this arrangement, the helically wound strips 52 and 54 seal the ends of the splice from moisture even when the splice is subjected to substantial bending as, for example, when the splice moves around a segment of a cable pulley or the like.

It will be apparent from the above described splice that a parted or broken cable can be quickly and efficiently spliced in the field to provide a splice that has flame resistant properties, is resistant to abrasion and has acceptable dielectric properties and is moisture resistant. Further, the splice is flexible and has a size slightly larger than the diameter of the insulation on the conductor cable.

It should be understood that the ends of the conductors may be connected to each other by a connector other than the sleeve 26. Also, the filler tape 38 and jacketing tape 44 – 50 may be applied as above described to a damaged portion of the insulation on a cable. The insulation can thus be repaired and the desired flexibility of the cable retained.

According to the provisions of the patent statutues, I have explained the principle, preferred construction and mode of operation of my invention and have illustrated and described what I now consider to represent its best embodiments. However, I desire to have it understood that within the scope of the appended claims the invention may be practiced otherwise than as specifically illustrated and described.

I claim:

1. A cable splice comprising,
    a metallic sleeve member extending over overlapped conductor end portions, said metallic sleeve member being deformed to frictionally engage the conductor end portions and forming a recessed portion between the edges of the cable insulation,
    said recessed portion having an elastomeric filler material positioned therein between the edges of the cable insulation and around the metallic sleeve member and the conductor end portions, said filler material having an outer surface with a diameter slightly larger than the diameter of the cable insulation,
    elastomeric filler tape positioned over the cable insulation and the elastomeric filler material, said elastomeric filler tape being helically wound in overlapped relation,
    elongated strips of abrasion resistant jacketing tape positioned longitudinally on the elastomeric filler tape with the side edges of side elongated strips in overlapped relation, and
    other strips of abrasion resistant jacketing tape helically wound about the end portions of said overlapped elongated strips to provide moisture resistance for the splice end portions.

2. A cable splice as set forth in claim 1 which includes,
    a layer of cement between the cable insulation and the helically wound elastomeric filler tape.

3. A cable splice as set forth in claim 2 in which,
    said layer of cement extends beyond the edges of said helically wound elastomeric tape.

4. A cable splice as set forth in claim 3 which includes,
    said helically wound jacketing tape extending around said cemented surface of said cable insulation.

* * * * *